US011998922B2

(12) United States Patent
Gusman del Campo

(10) Patent No.: US 11,998,922 B2
(45) Date of Patent: Jun. 4, 2024

(54) PARTICLES GRINDING AND CLASSIFYING SYSTEM AND METHOD OF USING THE SAME

(71) Applicant: Bernardo Gusman del Campo, Des Moines, IA (US)

(72) Inventor: Bernardo Gusman del Campo, Des Moines, IA (US)

( * ) Notice: Subject to any disclaimer, the term of this patent is extended or adjusted under 35 U.S.C. 154(b) by 328 days.

(21) Appl. No.: 17/633,202

(22) PCT Filed: Aug. 5, 2020

(86) PCT No.: PCT/US2020/045072
§ 371 (c)(1),
(2) Date: Feb. 6, 2022

(87) PCT Pub. No.: WO2021/026277
PCT Pub. Date: Feb. 11, 2021

(65) Prior Publication Data
US 2022/0331812 A1 Oct. 20, 2022

Related U.S. Application Data

(60) Provisional application No. 62/882,731, filed on Aug. 5, 2019.

(51) Int. Cl.
*B02C 13/20* (2006.01)
*B02C 13/16* (2006.01)
(Continued)

(52) U.S. Cl.
CPC .............. *B02C 13/20* (2013.01); *B02C 13/16* (2013.01); *B02C 13/284* (2013.01); (Continued)

(58) Field of Classification Search
CPC ......... B02C 13/14; B02C 13/16; B02C 13/20; B02C 13/286; B02C 13/284; B02C 13/288; B02C 2013/28609; B02C 2013/2869
See application file for complete search history.

(56) References Cited

U.S. PATENT DOCUMENTS 3,840,189 A * 10/1974 Kanengieter .......... A01K 5/002
241/101.8
4,998,678 A 3/1991 Durr
(Continued)

FOREIGN PATENT DOCUMENTS

GB 522339 A * 9/1939 ............ B02C 13/18
GB 522339 A 6/1940
(Continued)

*Primary Examiner* — Bobby Yeonjin Kim
(74) *Attorney, Agent, or Firm* — Hoglund & Pamias, PSC; Roberto J. Rios

(57) ABSTRACT

A grinder device is provided with two sets of counter-rotating impact elements that pulverize the material via collisions, which represent impact forces twice as powerful through the doubling of the tip velocity. A continuous self-discharge of harder and heavier particles is provided to assure higher energy efficiency and a cleaner product that subjects the unit to less wear and tear. Outlet ports are provided on flange caps that are removably attached to the grinder device so that the position of the outlet port with relation to the position of a grinder stator is selectively modified. The device of the present invention can be provided in a container for integrating into an existing system or to operate as a standalone unit.

33 Claims, 7 Drawing Sheets

(51) Int. Cl.

| | |
|---|---|
| ***B02C 13/284*** | (2006.01) |
| ***B02C 13/286*** | (2006.01) |
| ***B02C 13/288*** | (2006.01) |
| ***B02C 23/14*** | (2006.01) |

(52) U.S. Cl.

CPC ............ *B02C 13/288* (2013.01); *B02C 23/14* (2013.01); *B02C 2013/28609* (2013.01)

(56) References Cited

U.S. PATENT DOCUMENTS

| | | | | |
|---|---|---|---|---|
| 5,695,130 | A | | 12/1997 | Csendes |
| 5,769,338 | A | * | 6/1998 | Yashima ................. B02C 17/16 241/79 |
| 6,135,370 | A | * | 10/2000 | Arnold ................ B02C 19/0081 241/1 |
| 6,443,376 | B1 | | 9/2002 | Huang et al. |
| 8,888,027 | B2 | | 11/2014 | Trembley et al. |

FOREIGN PATENT DOCUMENTS

| | | | | | |
|---|---|---|---|---|---|
| GB | 931818 | A | * | 5/1961 | ............. B02C 15/12 |
| GB | 931818 | A | | 7/1963 | |

* cited by examiner

PARTICLES GRINDING AND CLASSIFYING SYSTEM AND METHOD OF USING THE SAME

FIELD OF THE INVENTION

The present invention is directed to a device that grinds and reduces solids to a small particle size while simultaneously controlling the size distribution of the exit particles thereby narrowing the target particle size produced. More specifically, the invention is directed to a device that can be integrated into a grinding system or it can be containerized, transported and operated in a modular/separate fashion as a mobile and stand-alone unit or can be integrated into a grinding facility.

BACKGROUND OF THE INVENTION

Previous grinding systems have utilized the following grinding approach: fixed impact elements that rotate as opposed to free floating impact elements (e.g. grinding balls inside rotating drum). Rotating elements such as; hammers, knife, pins, etc. have been designed specifically to break down materials based on the impact forces.

SUMMARY OF THE INVENTION

The present invention provides a finer grind and is more energy efficient with higher throughputs for similar operating conditions than previous systems. The streamlined design can more precisely control the grinding process and the distribution/classification of particles.

According to an aspect of the invention, the grinding device includes a plurality of stacked rows of knives having a predetermined separation between each knife.

According to yet another aspect of the invention, the device includes a stator and rotor arrangement, the rotor has a plurality of stacked rows of knives having a predetermined separation between each row.

According to still another aspect of the invention, the device includes a pair of stator and rotor arrangement.

In accordance to an aspect of the invention, an inlet port is located at a bottom portion of a grinder casing.

According to one aspect of the invention, the device is provided with a pair of inlet ports located at a bottom portion of a grinder casing.

According to another aspect of the invention, an outlet port is located at a top portion of a grinder casing.

According to one aspect of the invention, the device is provided with a pair of outlet ports located at a top portion of a grinder casing.

According to another aspect of the invention, an outlet port adapter is provided for selectively changing the position of said outlet port in relation to a center of the rotor.

According to still another aspect of the invention, one or more discharge ports are provided at a bottom portion of a grinder casing.

According to yet another aspect of the invention, the rotors of a pair of stator and rotor arrangement are rotated in opposite directions.

According to one aspect of the invention, a grinder casing is provided with heat dissipating elements.

According to an aspect of the invention, the device includes at least one temperature sensor inside a grinder casing, the at least one temperature sensor can be positioned between a discharge port and an inlet port.

According to another aspect of the invention, a discharge lid element is provided on the discharge port to completely or partially block the passage of particles through a discharge port.

According to still another aspect of the invention, an air circulating device is provided outside a grinder casing to circulate air around the stator to reduce the temperature of the grinder.

According to yet another aspect of the invention, the stator includes two impacting screens provided with a separation in order to allow passage of the particles between the impacting screens.

According to an aspect of the invention, an attachment tube is inserted into a rotor cylindrical cavity.

According to another aspect of the invention, the amount and/or length of the knives provided on the rows of knives is different on each row.

According to still another aspect of the invention, the discharge port is positioned behind the inlet port in relation to the flow of the particles inside the grinder.

According to yet another aspect of the invention, the device is coupled with fans and an adjustable outlet port (with discreet or continuous adjustment) to remove the particles exiting the grinding chamber through draft forces which are varied and controlled by placement positions of an outlet flange or placed on the outside. Larger and heavier particles in a rotational motion will have more outward inertia, therefore the placement of the vacuum outlet further from the center of the spinning blades will remove particles of larger diameter. For ultrafine particles, the outlet is placed in the middle of the rotating rotor and there is an attachment that extends the vacuum port into the center hole of the rotor with finer screening capabilities.

BRIEF DESCRIPTION OF THE DRAWINGS

Further features and advantages of the invention will become apparent from the following detailed description taken in conjunction with the accompanying figure showing illustrative embodiments of the invention, in which.

Figure 1:
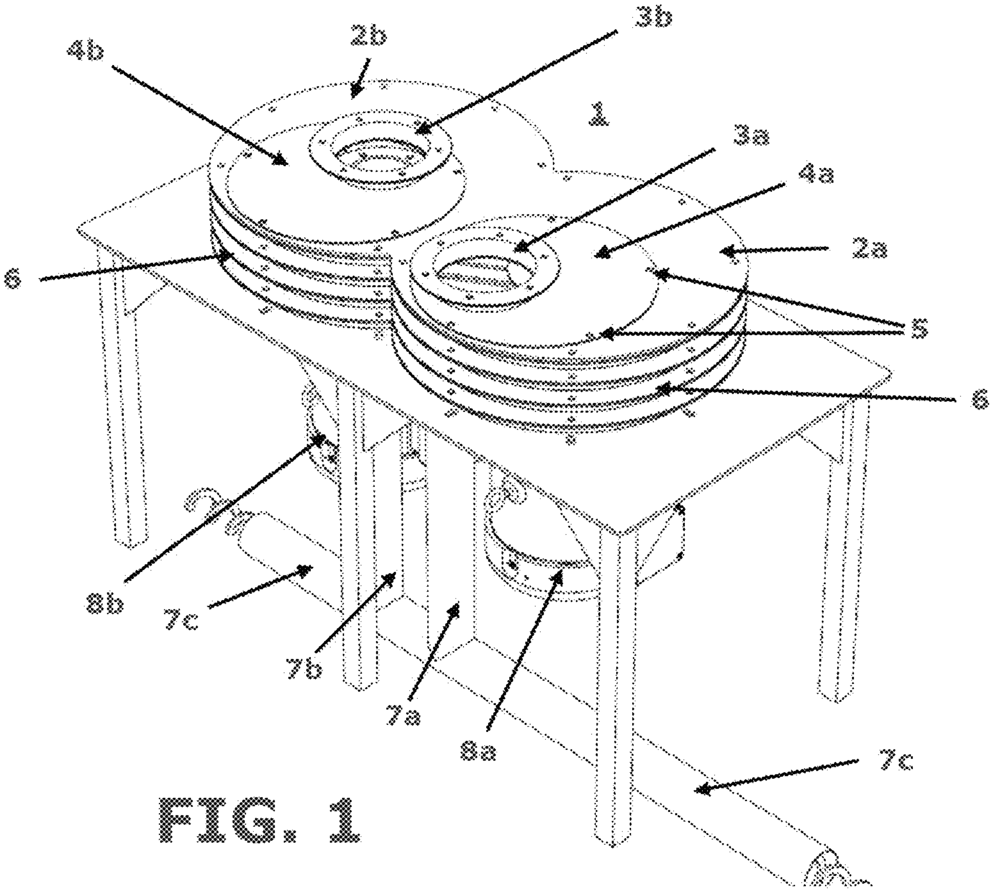
FIG. 1 shows a grinder device according to the present invention.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

According to a preferred embodiment of the invention, the grinder device includes two sets of counter-rotating impact elements that pulverize the material via collisions, which represent impact forces twice as powerful as previous systems through the doubling of the tip velocity.

A continuous self-discharge of harder and heavier particles (most are contaminants) assures higher energy efficiency and a cleaner product that subjects the unit to less wear and tear. The particles reside in the system until they are ground or discharged through the discharge port. The particles reside a short period of time in the grinding chamber and are discharged at a faster rate than previous systems (seconds instead of minutes/hours or even failure to discharge). Many previous systems do not have discharge capabilities and the particles can remain in the chamber. Also, this approach makes it possible to produce a cleaner product as these particles are generally impurities such as soil, sand, metal shavings, biomass particles and/or mineral components from the biochar that is being separated thus concentrating the carbon and organic fractions in the fine particles. The device of the present invention can be provided in a container for integrating into an existing system or to operate as a standalone unit.

The ratio of draft force to centrifugal force (or the apparent outward force), which is modulated by the adjustable speed of the blades and the vacuum created by pneumatic blowers as well as the position of the outlet port precisely, define and classify a narrow particle size with a narrow size distribution.

Grinding systems typically produce a dust on the surroundings (particles that leak from the system). System with positive pressure have the problem that the particles can leak out anytime leaking particles out throughout the entire system. However, the device of the invention does not generate dust at all due to the design feature of a vacuum being present throughout the system regardless of any problems or malfunctions before the dust collector (if dust collector break, e.g. filter break then it could leak out). An important advantage of the present invention is that it can be kept containerized outside and isolated.

The present invention provides a self-cleaning grinder device that does not require external cleaning or a shutdown procedure since it features a continuous on-demand cleaning procedure. This self-cleaning ability represents: a purer material with less contaminants, a reduction on energy consumption (since the presence of heavy particles that can wear down the system and are very difficult to grind are reduced or eliminated), faster grinding speeds at a comparable power consumption rate, less heat produced by the blades, less hazardous temperatures that might produce an ignition or explosion, more energy efficiency and less power consumption overall.

Figure 2:
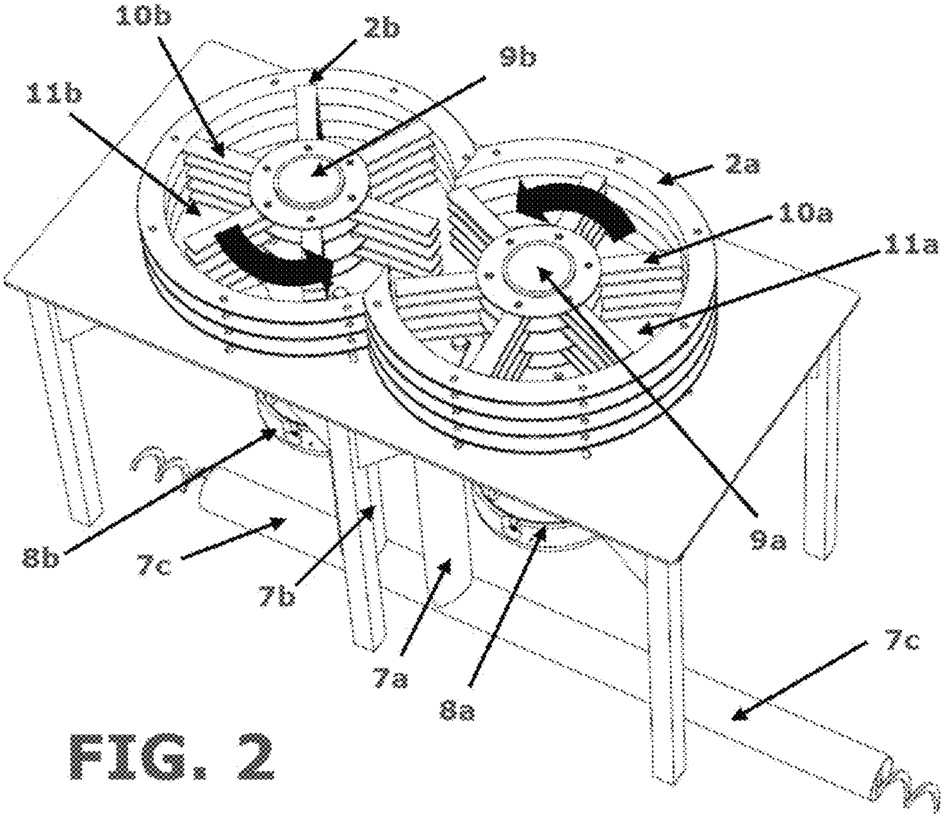
FIG. 2 shows a grinder device without its outer casing according to the present invention.

As shown in FIG. 1 and FIG. 2, the grinder device 1 of the invention includes two grinder units (2*a*, 2*b*) that are contained inside an outside casing. The grinder device 1 has a first flanged outlet port 3*a* associated to the first grinder unit 2*a* and second flanged outlet port 3*b* associated to the second grinder unit 2*b*. As can be appreciated, the outlet ports are provided on respective flange caps 4*a* and 4*b* which can be selectively rotated to adjust the position of the respective flanged outlet ports (3*a*, 3*b*). For example, FIG. 1 shows an embodiment where the left flanged outlet port 3*b* is located closer to the center of the grinder unit 2*b* to produce finer material and the right flanged outlet port 3*a* is located towards the edge of the grinder unit 2*a* or outside casing where the particles impact as well for producing bigger particle material. The overall fine adjustment of the procedure comes from changes made to the ratio of draft forces (vacuum) to centrifugal forces, blades speed and outlet location which allows for selection and treatment of particles based on size.

Each flange cap (4*a*, 4*b*) is attached to the outside casing by a plurality of securing points 5 located around the border of the flange cap. The position of the outlet ports is adjusted by detaching each flange cap (4*a*, 4*b*) at the securing points 5, independently rotating the flange caps (4*a*, 4*b*) until each outlet port (3*a*, 3*b*) reside at a desired position in relation to center of the grinder unit (2*a*, 2*b*) and reattaching the flange cap (4*a*, 4*b*) back to the outer casing at the securing points 5. The outlet ports (3*a*, 3*b*) can also be automatically rotated by rotating clamps that perform the same manual function without the intervention of the operator and/or without the need to stop operation of the system.

Figure 5:
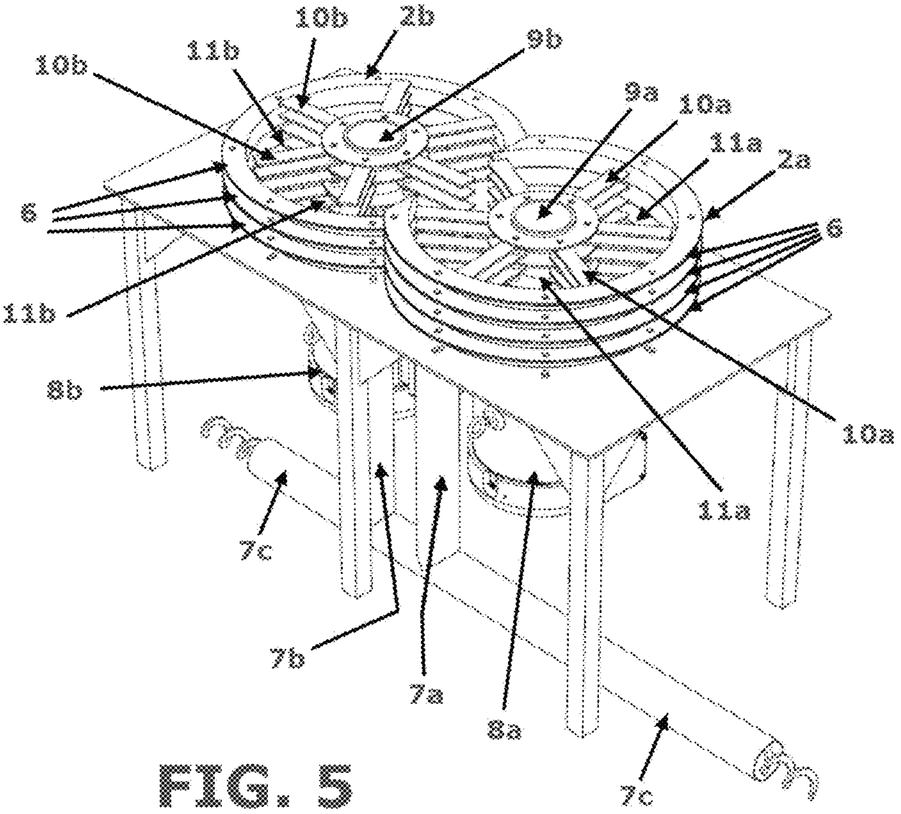
FIG. 5 shows a perspective view of a grinder device without its outer casing according to the present invention.
Figure 6:
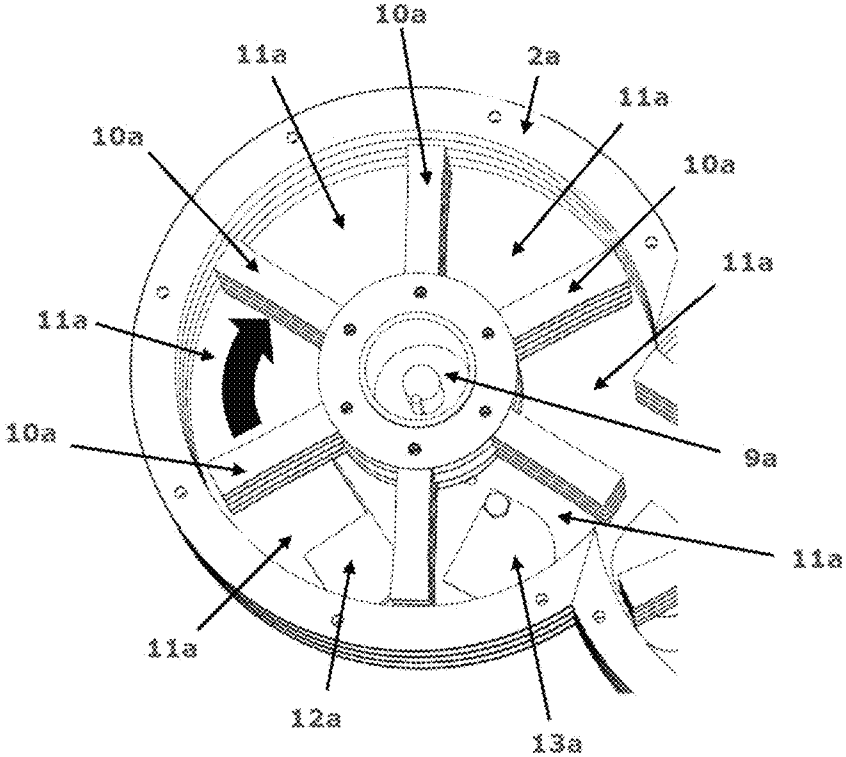
FIG. 6 shows a top view of a grinder device according to the present invention.

As can be appreciated on FIG. 2 and FIG. 5, each grinder unit (2*a*, 2*b*) includes and arrangement of staggered or stacked impact elements (10*a*, 10*b*). In a preferred embodiment, impact elements 10 are sharp knive elements. However, other impact elements can be used as long as they provide the same grinding properties of a knife element. An impact element arrangement is formed by providing at least one impact element 10 radially extending away from the center of the rotor collecting unit 9 which is coupled to the rotor 8. The grinder device 1 of the invention is created be staggering or stacking a plurality of rows of these impact element arrangements which are vertically separated at a predetermined distance as shown in the FIG. 2. In a preferred embodiment of the invention, the impact element arrangements rows are separated at ½ inch increments above each other. This allows for unrestricted motion inside the chamber so that the impact elements from each rotor pass very close to each other in a counter rotation at high speeds. The impact elements 10 on each arrangement are distanced from each other at predetermined angles which can be identical or different. Furthermore, the number of knives or impact elements, the shape and configuration within each rotor can be selected and modified for various purposes. For example, six knives can be provided on a bottom row of the rotor, then a row of four knives is provided on top, three knives on the following row and a two knives on the top row, or vice versa with the six knives row being provided at the top. The knive arrangement can have for example a conical configuration where the length of the knives is reduced from the bottom row to the top row, or vice versa. Alternatively, an inversed configuration can be provided with one rotor having a length of the knives reducing from top to bottom and the other rotor having a length of the knives reducing from bottom to top.

Normally, small particles that are heavier than carbon usually reside in an equipment as they are being continuously ground thereby wearing down the equipment. For example, sand and silica components or metal shavings and glass powders reside in the equipment until ground (or some are unable to be ground down) and this causes wear on hammers and higher energy consumption as particles remain for long periods of time or even days. However, the grinder device of the present invention provides a port that allows for continuous cleaning and reducing wear and tear of the equipment.

Figure 4:
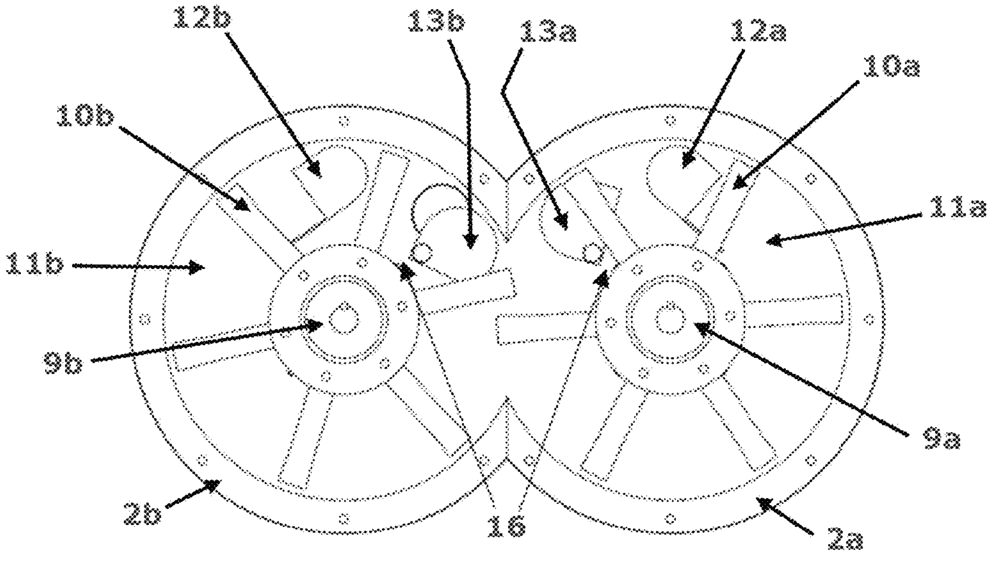
FIG. 4 shows a top view of a grinder device without its outer casing and one dispatch port open according to the present invention.

In operation, particles enter the grinder device 1 from an inlet port (12*a*, 12*b*) and travel around the grinder's inner space (11*a*, 11*b*) almost an entire rotation before being able to be discharged through a discharge port (13*a*, 13*b*). Heavier particles such as sand, silica, rocks, metal shavings and other heavier elements are discharged via self-discharge tubes (7*a*, 7*b*) connected to said discharge ports (13*a*, 13*b*) and augured out of the system via auger 7*c* thereby preventing wear and tear. By removing these particles from inside the grinder device 1, the temperature of the grinder device decreases quite significantly reducing flammable hazards and the electrical consumption of the motor (up to 50% energy reduction is achieved when the device is completely cleaned). This is especially true, when the material being ground contains a large percentage of foreign material. Moreover, the grinder device 1 includes a plurality of heat dissipating fins 6 provided on the outside casing as shown in FIGS. 1, 2 and 4. A thermocouple 16 for measuring the temperature of the grinder device 1 is inserted inside the grinder chamber (preferrably ½ inch) and placed between the discharge port (13*a*, 13*b*) and the inlet port (12*a*, 12*b*) to measure the temperature of the material being ground.

Figure 3:
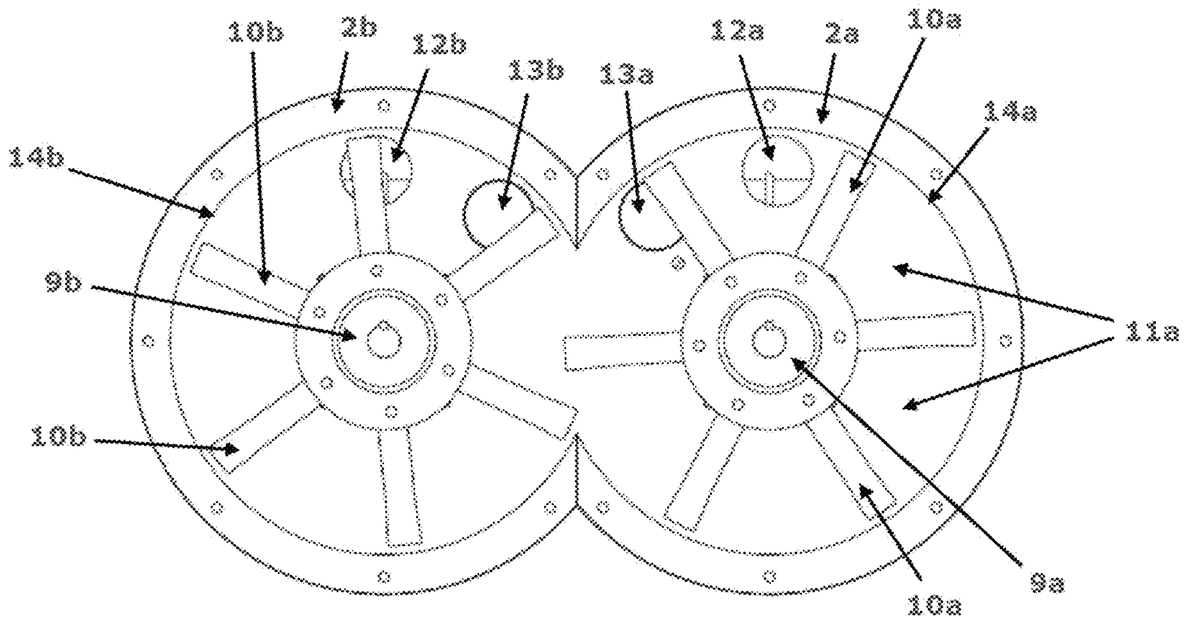
FIG. 3 shows a top view of a grinder device without its outer casing according to the present invention.

FIG. 4 shows an example where the right rotor section 2*a* has the discharge port 13*a* closed and the left rotor section 2*b* has the discharge port 13*b* 50% opened. The discharge ports (13*a*, 13*b*) are connected to self-discharge tubes (7*a*, 7*b*) which remove the materials via auger 7*c* in a continuous fashion. When a discharge port remains closed or is not operational as illustrated in FIG. 3, unpyrolyzed biomass including contaminant materials remain inside the grinder's inner space (11*a*, 11*b*) causing abnormal wear to the blades by foreign material. The unpyrolyzed material is typically denser than char and thus tends to reside in the bottom of the grinder's inner space (11*a*, 11*b*), where it is removed by the self-cleaning arrangement of the invention via the discharge ports (13*a*, 13*b*), self-discharge tubes (7*a*, 7*b*) and auger 7*c*.

Figure 12:
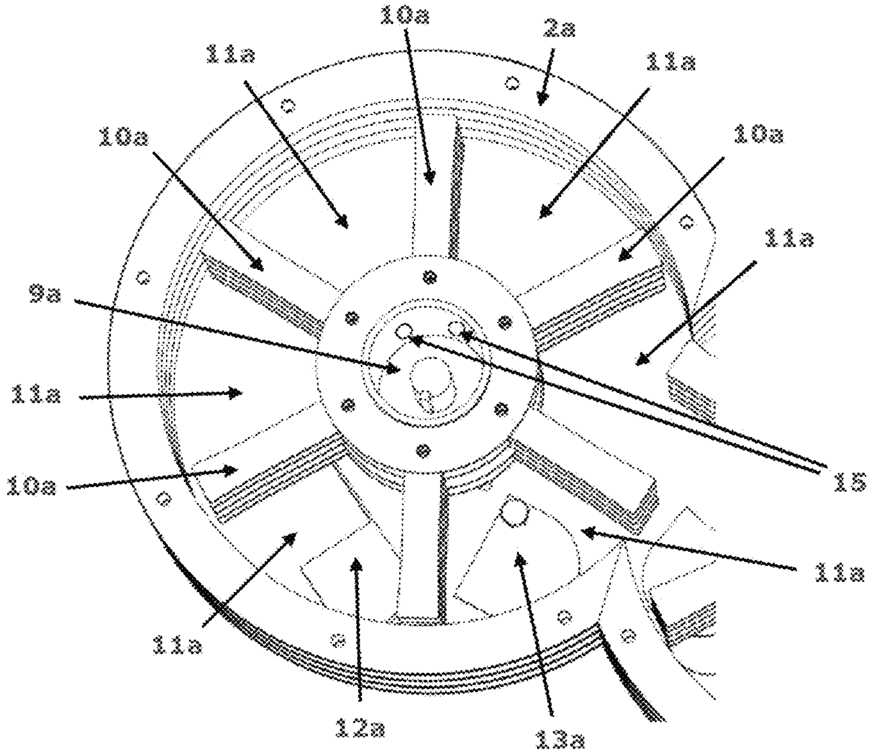
FIG. 12 illustrates a top view of a grinder device including holes inside its rotor according to an embodiment of the present invention.
Figure 13A:
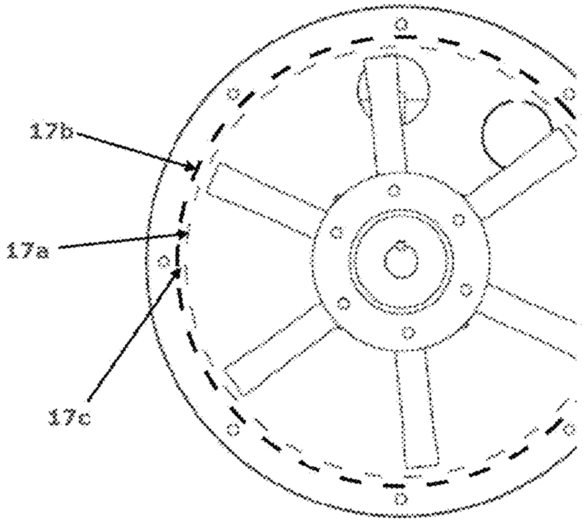
FIG. 13*a* illustrates a top sectional view of a grinder device including two impacting screens according to an embodiment of the present invention.
Figure 13B:
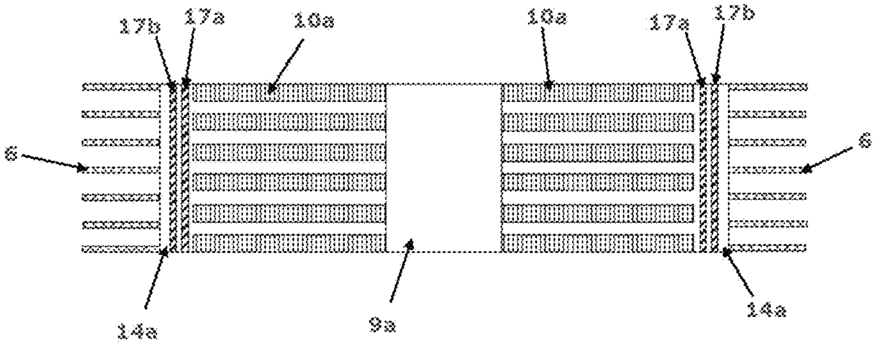
FIG. 13*b* illustrates a side sectional view of a grinder device including two impacting screens according to an embodiment of the present invention.
Figure 13C:
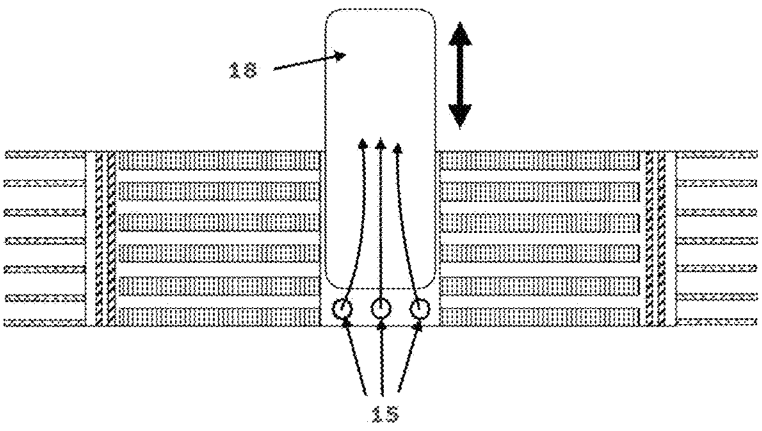
FIG. 13*c* illustrates a side sectional view of a grinder device including holes inside its rotor and an attachment tube according to an embodiment of the present invention.

The stator of the grinder device 1 can have different configurations for different materials. For example, as shown in FIG. 13*a* and FIG. 13*b*, impacting screens (17*a*, 17*b*) are preferably provided at an inner wall 14*a* of the rotor with a defined separation between the screens in order to allow passage of the desired particles between the screens. In addition, when super fine material is needed, an attachment is provided on the outlet flanged port (3*a*, 3*b*) of the grinding chamber. According to a preferred embodiment, the attachment is a tube 18 that is inserted and goes from the top down into the rotor cylindrical cavity 9*a* in order to suction the particles from slots 15 provided inside of the rotor as shown in FIG. 12 and FIG. 13*c*. This attachment forces the particles to enter the outlet directly from the slots 15 of the rotor instead of entering from the top of the rotor and chamber.

A typical configuration of a system using the grinder device of present invention will be explained in conjunction with FIGS. 7-11. The particles move from the grinder device 1 to a cyclone 30 where larger particles are separated and then to the dust collector 50 where finer particles are collected. For simplicity of understanding, the system is illustrated in linear fashion, but all the equipment can be placed and arranged differently and/or within a shipping container. The cyclone 30 and dust collector 50 include augers to transfer the ground material into to specific supersacks (70*b*) in a continuous fashion so that air locks are not required thereby reducing costs and allowing for simplicity. Some or all the material from the cyclone 30 and/or dust collector 50 can alternatively be returned to the grinder device 1 for further grinding. According to a preferred embodiment, a supersack 70*a* is provided where a bottom port allows any material contained within the supersack 70*a* to be directed into the bin 62. The inlet/lid arrangement 71 is configured to receive material coming from the cyclone 30 and/or dust collector 50 via respective augers. In addition, new material to be ground can be feed into the supersack 70*a* via the inlet/lid arrangement 71. It is also envisioned that the new material to be ground can be directly feed into an infeed auger 60 without the use of the supersack 70*a*. Furthermore, the material feed into the infeed auger 60 can be previously dried (e.g., by moisture removal, heating, etc. . . . ), wherein an automatic controlled drying step can be incorporated into the system in order to prepare the material prior to being feed into the grinder device 1.

Figure 7:
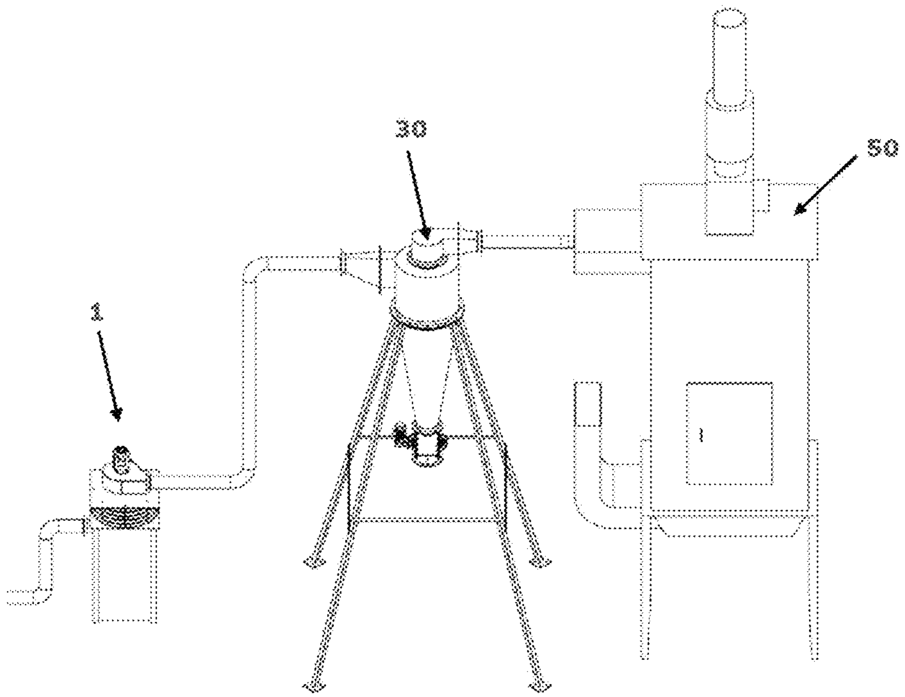
FIG. 7 illustrates a particle grinding and classifying system including the grinder device according to an embodiment of the present invention.

In addition, the material can be collected only with the dust collector 50 without using the cyclone 30 to reduce equipment usage. However, for finer material, the cyclone 30 is recommended as it separates larger particles. FIG. 7 illustrates an embodiment of the system configuration including a grinder device with a single rotor/stator arrangement, but it is to be understood that two or more rotor/stator arrangements can be used as shown in the Figures. For simplicity of explanation, inlet transfer auger, auger from discharge port, and augers from cyclone and dust collector product outlet are not shown but are provided and used as previously explained in accordance with the spirit of the invention.

According to a preferred embodiment of the invention, the system is completely or partially housed in a shipping container with an end of an infeed auger 60 being coupled to a bin 62 containing the material to be ground and suction is used to elevate the material through the infeed auger 60 into the grinder device 1. This is preferably done pneumatically by coupling a vacuum blower to an infeed port 63 of the infeed auger 60 which creates the necessary suction to transfer the material to be ground into the inlet ports (12*a*, 12*b*) of the grinder device 1. A drum 61 is coupled to another end of the infeed auger 60 and collects and removes rocks and very large and dense particles as well as foreign material since those are not drawn in by the suction forces, representing the first layer of protection and impurity separation for the grinder and cleaning system of the present invention. Suction forces allow the proper material to continue through the process while filtering out the unwanted material. Of course, it will be appreciated that the pressure used to carry out this step is selected and controlled based on the amount and type of material.

Figure 8:
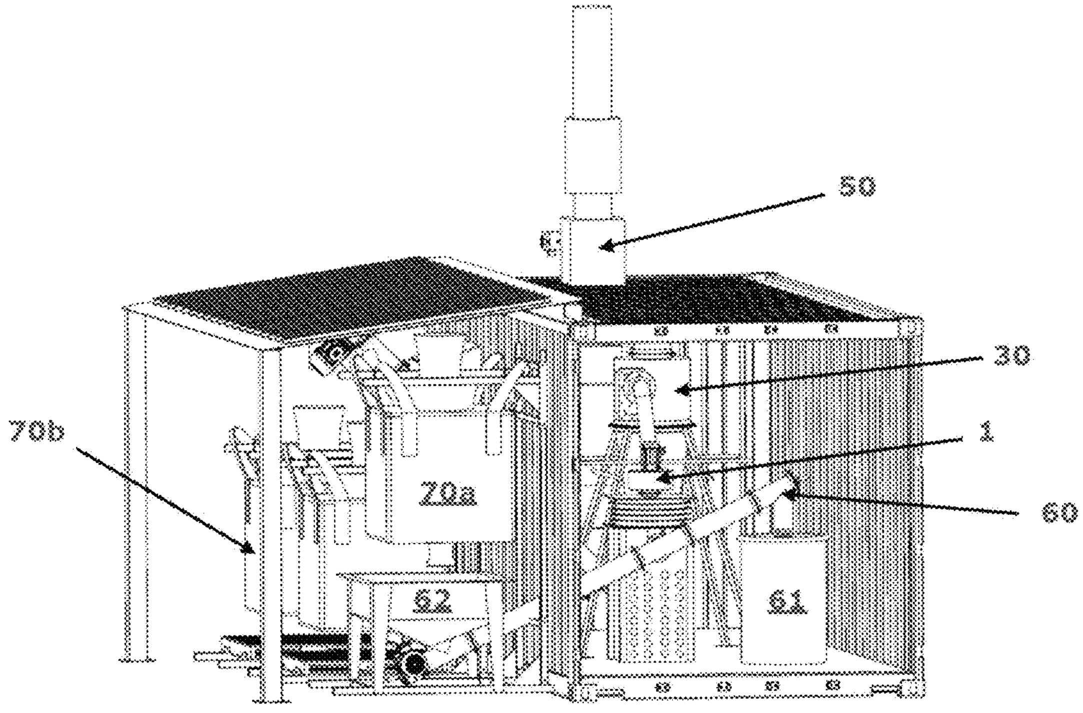
FIG. 8 illustrates another particle grinding and classifying system including the grinder device according to an embodiment of the present invention.
Figure 9:
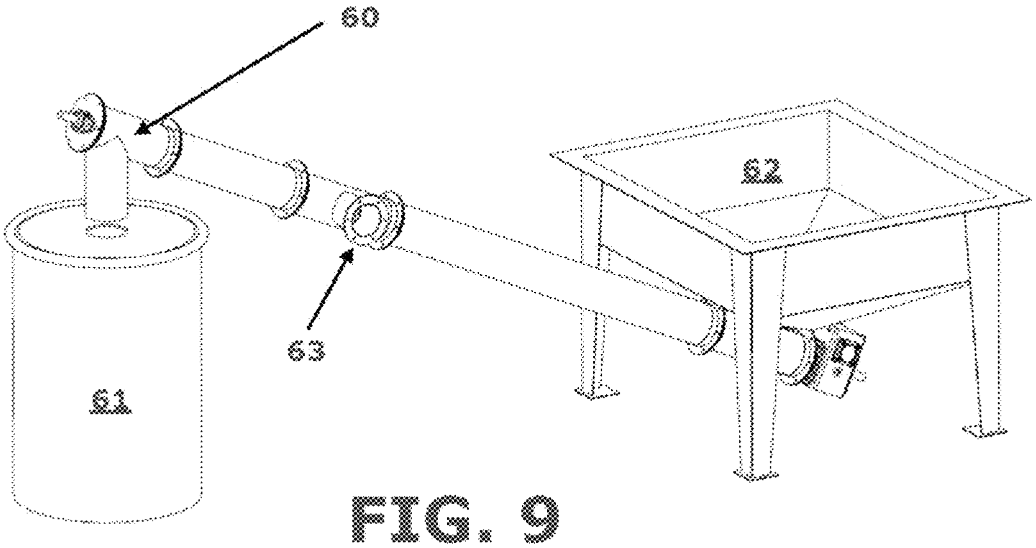
FIG. 9 illustrates a system for removing initial debris according to an embodiment of the present invention.
Figure 10:
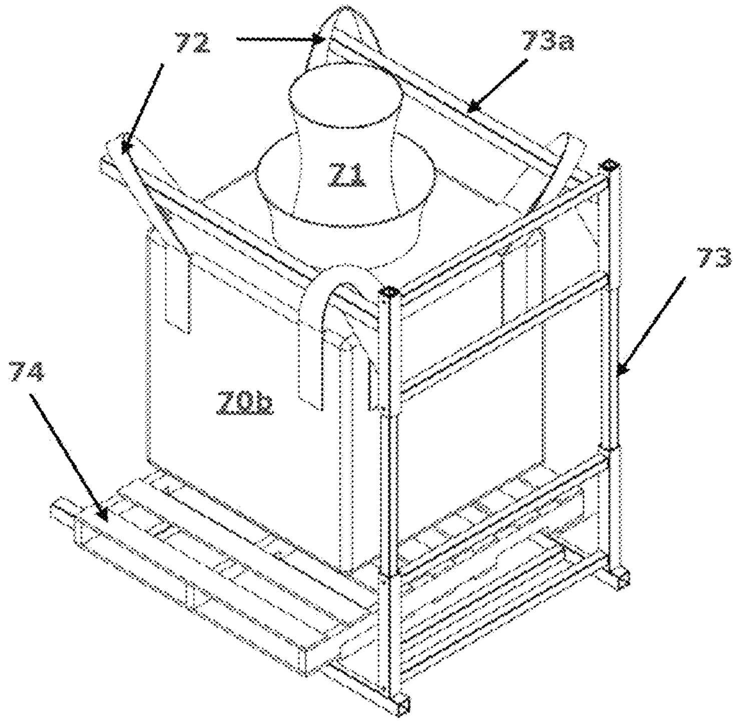
FIG. 10 illustrates a supersack for transporting a finished ground product according to an embodiment of the present invention.

According to an embodiment of the invention, the system can be configured so that the outlet ports 3*a* and 3*b* are both connected to the same cyclone 30 and the dust collector 50 or can be individually connected in parallel to separate cyclone and dust collection lines (30/50) allowing for different particle size collection. The finished ground product obtained via the cyclone 30 and dust collector 50 is augured out and dropped into supersacks ready for shipping as shown in FIG. 8. An embodiment of a final supersack 70*b* containing the finished ground product from the cyclone 30 or dust collector 50 is illustrated in FIG. 10. The final supersack 70*b* has an inlet/lid arrangement 71 configured to receive the finished ground material from output augers coming from the cyclone 30 or dust collector 50 and could also provide a locked seal arrangement for ease of transportation and storage. The final supersack 70*b* is attached to a support frame 73 via a pair of arms 73*a* that are inserted through supporting elements 72 of the final supersack 70*b*. Once the final supersack 70*b* is full and/or ready for shipping, it is placed over a cargo platform (e.g., wooden cargo pallet) and moved so that the supporting elements 72 are removed from the pair of arms 73*a* for transportation to a desired location.

Figure 11:
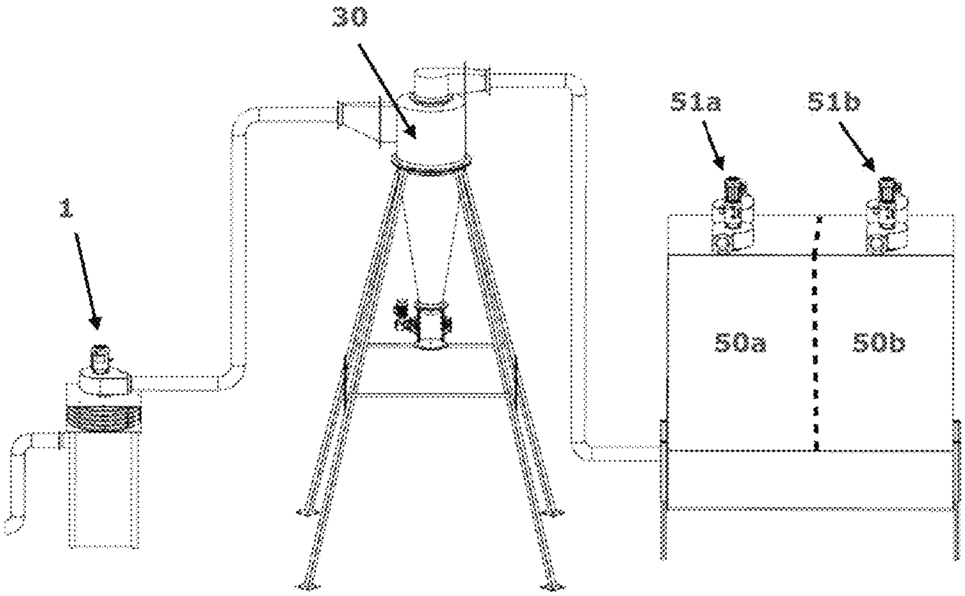
FIG. 11 illustrates a particle grinding and classifying system including the grinder device and a dust collector with a double blower system according to an embodiment of the present invention.

FIG. 11 illustrates an embodiment of the invention, where a double blower system is added onto the dust collector 50 providing excellent results. The dust collector comprises two dust collector systems 50*a* and 50*b* that allow the continuous running and operation of one collector system while the other collector system is being cleaned or services. In this way, there are no "cleaning cycles" as one collector system will be always operating and removing the particles while the other is being cleaned or serviced. Previous systems use compressed air or shaking of the filtration socks or cartridges, where the most common approach is intermittent air blowing off the filters. However, these components are very expensive (cleaning systems), filters can be easily damaged and they require a lot of energy to operate. In addition, compressed air requires big compressors and a lot of energy and are prone to fail. In an embodiment, the baghouse (or dust collector) is self cleaned by two or more parallel cleaning systems. In a preferred embodiment, the system comprises eight bags and four motors for the blowers, (51*a*, 51*b*) wherein each section includes four bags and two motors. Approximate pressure drops throughout the system are selected and modified with the configuration of the system. As a preferred example illustrated in FIG. 7, the grinder device 1 is provided at a vacuum pressure of two inches of water, the cyclone 30 at four inches of water and the dust collector 50 at six inches of water. As can be appreciated, the system is designed for low vacuum needs which results in less power consumption.

One important aspect of the invention is that the seals of the motors and the reducers do not need to be as tight and precise as the ones used in prior systems. On positive pressure systems, the dust will go or slip between the bearing and shaft of the motors or from the gear reducers to the motor destroying the bearings and the motors. In order to avoid this problem, those systems use special motors and sophisticated seals. However, the vacuum arrangement created in the system of the present invention allows the use of regular inexpensive motors. According to an embodiment of the invention, all motors used in the system are outside the container except for the grinder device for safety and prevention of fires or explosions. It is also envisioned to enclose the grinder and include openings on the grinder enclosure for outside air access (a ventilation screen on the outside wall with screens on the side of the container). This is done to maintain the grinder separate inside the container, like a division or a room with its own ventilation to the outside.

Another advantage of the present invention is that for some materials the cyclone 30 is unnecessary as the particle grinding is very precise. While it has been explained as a common component of the system, the grinder device 1 and the dust collector 50 can be used without a cyclone 30 as the unit can classify the particles very well for some applications and materials. The system can also provide air circulating externally around the stator in order to cool down the grinder and speed up the process while improving safety.

The grinder temperature is a key aspect during the grinding process which is controlled and automated according to the present invention. For example, when the temperature reaches 90° C. the infeed auger is stopped since higher temperatures can start smoldering the particles and have a smokeless fire or in other materials/situations fires and explosions. Also, if the electrical current consumed by the grinder device 1 is too high then a problem is identified. Accordingly, the infeed auger is stopped until the electrical current load drops. If it does not drop, then the self cleaning port might be clogged and the vacuum created is not adequate (filtration socks plugged), or for example, moisture of the material is too high making the particles too dense so that the particles will not exit the grinding chamber with typical running parameters. In addition, the infeed auger speed (i.e., feeding rate) is controlled by the amperage of the motor, so as to keep maximum grinding capacity, energy efficiency, wear, and a safe operation of the system. If the amperage requirement of the grinder is low then the infeed is increased and viceversa.

According to an embodiment of the invention, the level, intensity and amount of vacuum is monitored in various places throughout the system. The most important location being at the inlet of the baghouse where the vacuum is kept preferrably at a vacuum pressure of six inches of water (which can be changed with different configurations, for the different particle size and for the different material characteristics). Then one dust collector system might be off or running very slow (while is being cleaned or serviced) and the other dust collector system compensates with high speed and vacuum to keep the pressure of six inches of water constant all the time. Pressures values are dependent on system configuration and equipment used, so the exemplary values are for explanation purposes. Another important aspect of the invention is that no airlocks are used. The system of the invention provide augers that create the air locks with the material inside in order to save money, energy and avoid associated problems.

System automation is an important aspect of the invention. The system can monitor the particle amount and flow throughout the process so as to turn off or halt the system when the filtration socks for example are damaged or broken. The amperage of each motor is also monitored to identify any problem. For example, during normal operation augers use four amps so if only two amps are being consumed then it is possible that the material is not being transferred (likely problems of bridging in the inlet) or if six amps are being consumed then there might be moisture or contaminants causing higher energy needs (larger particles). Also, when there is a large rock or chunk in the infeed auger the system automatically stops the auger. Then the auger is reversed and forwarded a few times to allow the particle to go through and if it is small enough it will go through and be collected in a drum contaminant container. Otherwise, the system is stopped to prevent any damage and to further evaluate or correct the problem. The same approach is used with the temperature sensors and the amperage on the motors.

While the present invention has been described in what are presently considered to be its most practical and preferred embodiments or implementations, it is to be understood that the invention is not to be limited to the particular embodiments disclosed hereinabove. On the contrary, the present invention is intended to cover various modifications and equivalent arrangements included within the spirit and scope of the claims appended hereinbelow, which scope is to be accorded the broadest interpretation so as to encompass all such modifications and equivalent structures as are permitted under the law.

The invention claimed is:

1. A particle grinder comprising:
- a stator and rotor arrangement, wherein the rotor has a plurality of stacked rows of impact elements, each row of impact elements includes at least one impact element radially extending away from a rotor collecting unit;
- an inlet port and a discharge port located below said plurality of stacked rows of impact elements;
- an outlet port located above said plurality of stacked rows of impact elements; and
- an outlet port adapter that is selectively rotated to change the position of said outlet port in relation to a center of said rotor collecting unit.

2. The particle grinder of claim 1, wherein said impact elements have sharp edges.

3. The particle grinder of claim 1, wherein said plurality of stacked rows have a predetermined separation between each row.

4. The particle grinder of claim 1, wherein said stator and rotor arrangement includes heat dissipating elements.

5. The particle grinder of claim 1, further comprising at least one temperature sensor inside said stator and rotor arrangement.

6. The particle grinder of claim 5, wherein said at least one temperature sensor is positioned between said discharge port and said inlet port.

7. The particle grinder of claim 1, wherein said discharge port is completely blocked, partially blocked or completely unblocked by a discharge lid element.

8. The particle grinder of claim 1, further comprising an air circulating device circulating air around the stator to reduce a temperature of the grinder.

9. The particle grinder of claim 1, wherein said stator further comprises two impacting screens provided with a separation between each other to allow passage of particles between the impacting screens.

10. The particle grinder of claim 1, wherein said rotor collecting unit comprises at least one opening located below an upper opening of said rotor collecting unit.

11. The particle grinder of claim 10, further comprising an attachment tube configured to be inserted into the rotor collecting unit in order to suction particles close to said at least one opening.

12. The particle grinder of claim 1, wherein the number of impact elements provided is different on each row.

13. The particle grinder of claim 1, wherein the length of the impact elements provided is different on each row.

14. The particle grinder of claim 1, wherein the discharge port is positioned behind said inlet port in relation to the flow of particles inside the grinder.

15. The particle grinder of claim 1, further comprising a second stator and rotor arrangement, wherein the second rotor has a second plurality of stacked rows of impact elements, each row of the second plurality of stacked rows includes at least one impact element radially extending away from a second rotor collecting unit;
- a second inlet port and a second discharge port located below said second plurality of stacked rows of impact elements;
- a second outlet port located above said second plurality of stacked rows; and
- a second outlet port adapter that is selectively rotated to change the position of said second outlet port in relation to a center of said second rotor collecting unit.

16. The particle grinder of claim 15, wherein said plurality of stacked rows of impact elements is rotated opposite to a rotating direction of said second plurality of stacked rows of impact elements.

17. The particle grinder of claim 16, wherein said plurality of stacked rows have a first separation space between each row and said second plurality of stacked rows have a second separation space between each row, so that the impact elements of said plurality of stacked rows pass through said second separation space and the impact elements of said second plurality of stacked rows pass through said first separation space when both plurality of stacked rows are rotating.

18. The particle grinder of claim 1, wherein a size of particles to be ground are controlled by a suction pressure at said outlet port, a rotation speed of said rotor and the position of said outlet port in relation to the center of said rotor collecting unit.

19. The particle grinder of claim 15, wherein a size of particles to be ground are controlled by a suction pressure at both outlet ports, a rotation speed of both rotors and the position of each outlet port in relation to the respective center of said rotor collecting units.

20. A particles grinding and classifying system comprising:
- a particle grinder having:
- a stator and rotor arrangement, wherein the rotor has a plurality of stacked rows of impact elements, each row of impact elements includes at least one impact element radially extending away from a rotor collecting unit,
- an inlet port and a discharge port located below said plurality of stacked rows of impact elements,
- an outlet port located above said plurality of stacked rows of impact elements, and
- an outlet port adapter that is selectively rotated to change the position of said outlet port in relation to a center of said rotor collecting unit;
- an infeed auger having an input end configured to receive material to be ground, a grinder port coupled to said inlet port and an output end configured to direct unwanted material into a collection drum;
- a discharge auger coupled to said discharge port for receiving discharged material from said particle grinder;
- a dust collector coupled to said outlet port; and
- a dust collector auger having one end coupled to an output of said dust collector and another end directing particles from said dust collector into a storage container.

21. The particles grinding and classifying system of claim 20, further comprising a cyclone coupled between said outlet port and said dust collector, wherein a cyclone auger has one end coupled to an output of said cyclone and another end directing particles from said cyclone into another storage container.

22. The particles grinding and classifying system of claim 20, wherein said material to be ground is pneumatically moved through said infeed auger in order to direct said material to be ground into said grinder and the unwanted material into said collection drum.

23. The particles grinding and classifying system of claim 20, wherein said discharged material is directed to the input end of said infeed auger.

24. The particles grinding and classifying system of claim 21, wherein particles from said cyclone are directed to the input end of said infeed auger.

25. The particles grinding and classifying system of claim 20, wherein particles from said dust collector are directed to the input end of said infeed auger.

26. The particles grinding and classifying system of claim 20, wherein a size of ground particles is controlled by a suction pressure at said outlet port, a rotation speed of said rotor and the position of said outlet port in relation to the center of said rotor collecting unit.

27. The particles grinding and classifying system of claim 20, wherein said dust collector comprises two separate collection systems, each being individually controlled so that one collection system continues operating while the other collection systems is cleaned or serviced.

28. The particles grinding and classifying system of claim 20, wherein said discharge port is completely blocked, partially blocked or completely unblocked by a discharge lid element.

29. The particles grinding and classifying system of claim 20, wherein the discharge port is positioned behind said inlet port in relation to the flow of particles inside the particle grinder.

30. The particles grinding and classifying system of claim 20, wherein said particle grinder further comprises:

a second stator and rotor arrangement, wherein the second rotor has a second plurality of stacked rows of impact elements, each row of the second plurality of stacked rows includes at least one impact element radially extending away from a second rotor collecting unit;

a second inlet port and a second discharge port located below said second plurality of stacked rows of impact elements;

a second outlet port located above said second plurality of stacked rows; and a second outlet port adapter that is selectively rotated to change the position of said second outlet port in relation to a center of said second rotor collecting unit.

31. The particles grinding and classifying system of claim 30, wherein said plurality of stacked rows of impact elements is rotated opposite to a rotating direction of said second plurality of stacked rows of impact elements.

32. The particles grinding and classifying system of claim 30, wherein said plurality of stacked rows have a first separation space between each row and said second plurality of stacked rows have a second separation space between each row, so that the impact elements of said plurality of stacked rows pass through said second separation space and the impact elements of said second plurality of stacked rows pass through said first separation space when both plurality of stacked rows are rotating.

33. The particles grinding and class classifying system of claim 20, further comprising a temperature sensor positioned between said discharge port and said inlet port.

* * * * *